United States Patent [19]

Muryoi

[11] 3,839,724

[45] Oct. 1, 1974

[54] DEPTH OF FIELD INDICATOR FOR ZOOM LENSES

[75] Inventor: Takeshi Muryoi, Kawasaki, Japan

[73] Assignee: Nippon Kagaku K.K., Tokyo, Japan

[22] Filed: Aug. 6, 1973

[21] Appl. No.: 386,061

[30] Foreign Application Priority Data
Sept. 25, 1972 Japan.............................. 47-95096

[52] U.S. Cl.................. 354/198, 354/196, 354/289
[51] Int. Cl. ............................................. G03b 3/08
[58] Field of Search...................... 95/45, 64 A, 44 R

[56] References Cited
UNITED STATES PATENTS

| | | | |
|---|---|---|---|
| 2,949,835 | 8/1960 | Gebele | 95/45 X |
| 3,122,084 | 2/1964 | Singer et al. | 95/64 A |
| 3,221,628 | 12/1965 | Mahn | 95/45 |

Primary Examiner—Joseph F. Peters, Jr.
Assistant Examiner—Edna Marie O'Connor
Attorney, Agent, or Firm—Fitzpatrick, Cella, Harper & Scinto

[57] ABSTRACT

In a zoom lens system of the type wherein zooming is accomplished by rotation of an operating or zooming ring, the lens casing is constructed so as to indicate a depth of field corresponding to any desired $f$-value and any desired focal length when an aperture ring is rotated toward smaller $f$-values and when the zooming ring is rotated toward wider angles. The extent of the debth of field is indicated by two movable indicators respectively mounted on two rotatable rings.

4 Claims, 3 Drawing Figures 3,839,724

DEPTH OF FIELD INDICATOR FOR ZOOM LENSES

BACKGROUND OF THE INVENTION

1. Field of the Invention

This invention relates to a depth-of-field indicator for zoom lens systems, and more particularly to such an indicator for zoom lens systems wherein zooming is accomplished by rotation of an operating or zooming ring.

2. Description of the Prior Art

In photographic lenses of a single focal distance, there is known a mechanism which is responsive to rotation of an aperture ring to convert a depth-of-field indicator scale so as to indicate a depth of field corresponding to a respective $f$-value. Also, in zoom lenses, there is known a device having curved depth-of-field scale divisions formed on a lens casing in relation to focal lengths thereby to indicate a depth of field corresponding to a respective focal distance.

In the zoom lenses of the type wherein zooming is accomplished by rotating an operating ring, it has been difficult and impracticable to have the depth of field indicated in response to rotation of the zooming ring since rotation of that ring and of the aperture ring are associated.

SUMMARY OF THE INVENTION

The present invention enables, even in zoom lenses of the rotational zooming type, a depth of field corresponding to a respective f-value and a respective focal distance to be indicated by a simple construction, and intends differentially to indicate a depth of field in accordance with a desired $f$-value and a desired focal length.

According to the present invention, there is provided a zoom lens casing having a zooming ring rotatably mounted on its outer periphery for zooming operation. An aperture ring is rotatably mounted on the lens casing and a distance ring for focusing is also rotatably mounted on the lens casing and has a distance scale formed annularly on the outer periphery thereof. The lens casing has a pair of guide slots formed in an outer peripheral portion thereof and extending radially thereof. An inner casing is fixedly secured within the lens casing. A first rotatable member having a first indicator portion projected through one of the guide slots and opposed to the distance scale is disposed between the lens casing and the inner casing and is rotatable between limits defined by the guide of the first indicator portion and associated guide slot. A second rotatable member having a second indicator portion projected through the other guide slot and opposed to the distance scale is disposed adjacent the first rotatable member between the lens casing and the inner casing and is rotatable by the guide of the second indicator portion and associated guide slot. A differential gearing is provided to differentially detect the extent of rotation of the aperture ring and of the zooming ring and to transmit the detected extent of rotation to the first rotatable member. Means are also provided to transmit a rotation equal in extent but opposite in direction to the rotation of the first rotatable member to the second rotatable member, such means being connected to the first and second rotatable members so as to increase the spacing between the first and second indicator portions when the aperture ring is rotated toward smaller $f$-value and when the zooming ring is rotated toward wider angles.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings forming a part of the specification wherein.

DESCRIPTION OF THE PREFERRED EMBODIMENTS

Figure 1:
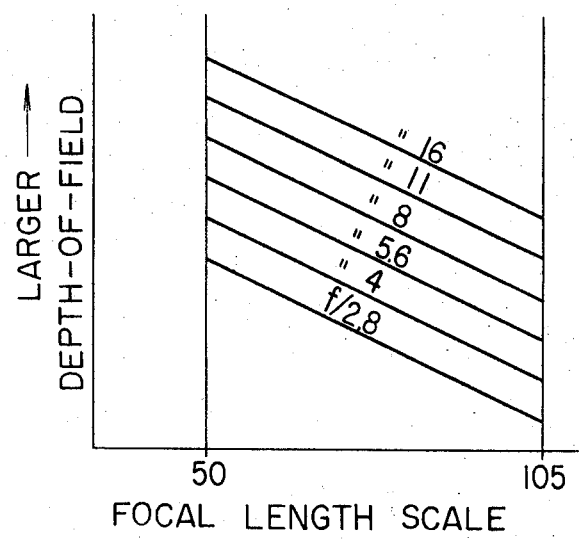
FIG. 1 is a graph illustrating the variations in depth of field with focal length and $f$-value in a zoom lens.

In a zoom lens, the depth of field is variable with both the focal length and the $f$-value, in the manner illustrated by the oblique lines in FIG. 1. An embodiment for satisfying such principle will be described hereunder.

Figure 2:
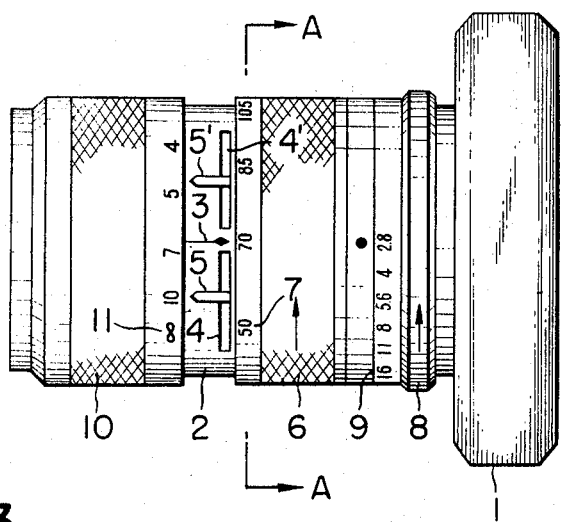
FIG. 2 is a pictorial view of the zoom lens casing according to an embodiment of the present invention.

Referring to FIG. 2, a camera body is designated by numeral 1 and a lens casing by numeral 2. The lens casing 2 is formed with an index mark 3 and guide slots 4 and 4' through which depth-of-field indicator portions 5 and 5' are projected outwardly, the indicator portions 5 and 5' being formed on rotatable members 20 and 16, respectively (FIG. 3), as will be described. A zooming ring is designated by numeral 6 and is formed with a focal length scale 7. An aperture ring is designated by numeral 8 and is formed with an aperture scale 9. A distance ring 10 is also formed with a distance scale 11.

Figure 3:
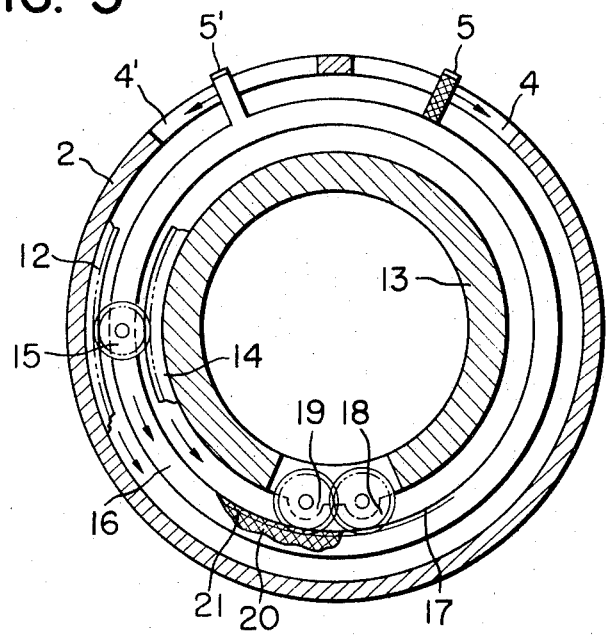
FIG. 3 is a cross-sectional view taken along line A—A in FIG. 2.

Referring to FIG. 3, a zooming gear 12 operatively associated with the zooming ring 6 is shown rotatably received in the lens casing 2, and an aperture gear 14, operatively associated with the aperture ring 8, is rotatably received over the outer periphery of an inner casing 13 formed integrally with the lens casing 2. A planetary gear 15 is rotatably mounted on the rotatable member 16 having at one end thereof the depth-of-field indicator portion 5' opposed to the distance scale 11, and is in meshing engagement with both the zooming gear 12 and the aperture gear 14. The rotatable member 16 is rotatably mounted on the lens casing 2 and has a gear portion 17. Pinions 18 and 19 are rotatably mounted on the inner casing 13 and mesh with each other, and the gear portion 17 is in meshing engagement with one of the pinions 18 which lies on the righthand side as viewed in FIG. 3. A rotatable member 20, having at one end thereof the depth-of-field indicator portion 5 opposed to the distance scale 11, is rotatably mounted on the lens casing 2 and also has a gear portion 21. The gear portion 21 is in meshing engagement with the left pinion 19. The pinions 18 and 19 together constitute a transmission member adapted to rotate the rotatable member 20 to an extent equal to the rotation of the rotatable member 16.

With such a construction, rotation of the aperture ring 8 in the direction of the arrow, as indicated in FIG. 2, i.e., toward smaller $f$-values, causes rotation of the aperture gear 14 in the direction of the arrow indicated in FIG. 3, whereby the planetary gear 15, providing a differential mechanism, effects its planetary movement which rotates the rotatable member 16 and the depth-of-field indicator portion 5' in the direction of the respective associated arrows. This rotation of the rotatable member 16 is transmitted through the pinions 18 and 19 to rotate the rotatable member 20 and accordingly the depth-of-field indicator portion 5 in the direction of its associated arrow. It will be apparent that the rotation of the depth-of-field indicator portion 5' is opposite in direction but equal in angle to the rotation of the depth-of-field indicator portion 5. Thus, the rotation of the aperture ring 8 toward the smaller $f$-values causes the spacing between the depth-of-field indicator portions 5 and 5' to be increased, and if this is made to correspond to the distance scale 11, it will indicate that the depth of field has been increased. This agrees with the principle illustrated in FIG. 1. Subsequently, when the zooming ring 6 is rotated in the direction of its arrow, i.e., toward wider angles, the zooming gear operatively associated therewith is rotated in the direction of the arrow, whereby the rotatable member 16 is rotated in the direction of its arrow and then the rotatable member 20 is rotated in the direction of arrow through the agency of the pinions 18 and 19, in the manner as described above. When the focal distance scale 7 on the zooming ring 6 is brought toward the wider angles, the depth of field is increased and this agrees with the principle of FIG. 1.

In this way, the zooming gear 12, the aperture gear 14 and the planetary gear together constitute a differential mechanism which adjusts the extent and direction of the rotation of the aperture ring 8 and of the zooming ring 6 and converts such rotation into the rotation of the depth-of-field indicator portions 5 and 5'.

Operation of an unshown optical system to provide a focal length corresponding to any division in the focal length scale 7 requires no special novel construction of the zooming mechanism using a cam, and therefore need not be described herein.

It will thus be appreciated that the present invention can provide for indication of a depth of field corresponding both to a desired $f$-value and a desired focal distance which has heretofore been difficult with zoom lenses of the type wherein the focal distance is changed by rotating the zooming ring, and thus the photographer can instantaneously be informed of a depth of field corresponding to the focal length and the $f$-value.

What is claimed is:
1. A zoom lens system comprising:
a zooming ring rotatably mounted on the outer periphery of a lens casing;
an aperture ring rotatably mounted on said lens casing;
a distance ring for focusing rotatably mounted on said lens casing, said distance ring having a distance scale formed radially on the outer periphery thereof;
said lens casing having guide means formed in an outer peripheral portion thereof and extending radially thereof;
an inner casing fixedly secured within said lens casing;
a first rotatable member having a first indicator portion arranged for cooperation with said guide means and opposed to said distance scale;
a second rotatable member having a second indicator portion arranged for cooperation with said guide means and opposed to said distance scale, said second rotatable member being disposed adjacent said first rotatable member;
a differential gear for differentially detecting the extent of rotation of said aperture ring and of said zooming ring and transmitting the detected extent of rotation to said first rotatable member; and
means for transmitting a rotation equal in extent but opposite in direction to the rotation of said first rotatable member from the same to said second rotatable member, said transmission means being connected to said first and second rotatable members so as to increase the spacing between said first and second indicator portions when said aperture ring is rotated toward small $f$-values and when said zooming ring is rotated toward wider angles.

2. A zoom lens system as defined in claim 1, wherein said guide means is a pair of slots formed in said lens casing and said first and second indicators each project through and cooperate with one of said slots, said first rotatable member being disposed between said lens casing and said inner casing and said second rotatable member being disposed adjacent said first rotatable member.

3. A zoom lens system as defined in claim 1, wherein said differential gear includes:
an internal gear operatively associated with said zooming ring and mounted for rotation on the inner periphery of said lens casing;
an external gear operatively associated with said aperture ring and mounted for rotation on the outer periphery of said inner casing; and
a planetary gear meshing with both of said internal and external gears and rotatably mounted on said first rotatable member.

4. A zoom system casing as defined in claim 1, wherein said transmission means includes:
a first gear portion provided in an inner peripheral portion of said first rotatable member;
a second gear portion provided in an inner peripheral portion of said second rotatable member;
a first gear rotatably mounted on said inner casing and meshing with said first gear portion; and
a second gear rotatably mounted on said inner casing and meshing with both of said second gear portion and said first gear, said second gear having the same number of teeth as said first gear.

* * * * *

UNITED STATES PATENT OFFICE
CERTIFICATE OF CORRECTION

Patent No. 3,839,724     Dated October 1, 1974

Inventor(s) TAKESHI MURYOI

It is certified that error appears in the above-identified patent and that said Letters Patent are hereby corrected as shown below:

In the Abstract, line 8, change "debth" to -- depth --.

Column 1, line 46, change "radially" to -- annularly --; line 58, after "rotatable" insert -- between limits defined --.

Signed and sealed this 7th day of January 1975.

(SEAL)
Attest:

McCOY M. GIBSON JR.
Attesting Officer

C. MARSHALL DANN
Commissioner of Patents